(12) United States Patent
Cao

(10) Patent No.: US 12,019,344 B2
(45) Date of Patent: Jun. 25, 2024

(54) DISPLAY PANEL AND DISPLAY DEVICE

(71) Applicant: Shenzhen China Star Optoelectronics Semiconductor Display Technology Co., Ltd., Guangdong (CN)

(72) Inventor: Jie Cao, Shenzhen (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,253

(22) PCT Filed: Oct. 25, 2021

(86) PCT No.: PCT/CN2021/125942
§ 371 (c)(1),
(2) Date: Dec. 28, 2021

(87) PCT Pub. No.: WO2022/257326
PCT Pub. Date: Dec. 15, 2022

(65) Prior Publication Data
US 2024/0036424 A1 Feb. 1, 2024

(30) Foreign Application Priority Data
Jun. 10, 2021 (CN) .......................... 202110646574.6

(51) Int. Cl.
*G02F 1/1368* (2006.01)
*G02F 1/1339* (2006.01)
*G02F 1/1362* (2006.01)

(52) U.S. Cl.
CPC ........ *G02F 1/1368* (2013.01); *G02F 1/13394* (2013.01); *G02F 1/136222* (2021.01)

(58) Field of Classification Search
CPC ....... G02F 2001/136222; G02F 1/1339; G02F 1/13394; G02F 2001/13396
See application file for complete search history.

(56) References Cited

U.S. PATENT DOCUMENTS

2011/0122357 A1\* 5/2011 Chang ............... G02F 1/133512
445/24
2017/0045773 A1\* 2/2017 Seo ................... G02F 1/136209
(Continued)

FOREIGN PATENT DOCUMENTS

| CN | 1529199 A | 9/2004 |
|---|---|---|
| CN | 102385196 A | 3/2012 |

(Continued)

OTHER PUBLICATIONS

Xie, English translation of CN-107861299-A (Year: 2018).\*

*Primary Examiner* — Jonathan Y Jung
(74) *Attorney, Agent, or Firm* — PV IP PC; Wei Te Chung; Zhigang Ma

(57) ABSTRACT

A display panel and a display device are provided. The display panel includes: a first substrate including: a TFT layer; and a color resist layer located on the TFT layer; the color resist layer is provided with an opening that at least partly penetrates the color resist layer; a second substrate located above the first substrate; and a photo spacer located between the first substrate and the second substrate, wherein an end of the photo spacer away from the second substrate is located in the opening.

14 Claims, 2 Drawing Sheets

(56) References Cited

U.S. PATENT DOCUMENTS

| | | | |
|---|---|---|---|
| 2017/0168341 A1* | 6/2017 | Hong | G02F 1/1368 |
| 2017/0192322 A1 | 7/2017 | Jung et al. | |
| 2018/0275471 A1* | 9/2018 | Park | G02F 1/1368 |
| 2018/0375056 A1* | 12/2018 | Sonoda | H10K 59/12 |
| 2019/0155091 A1 | 5/2019 | Chen et al. | |
| 2021/0397032 A1* | 12/2021 | Chen | G02F 1/13396 |
| 2023/0026623 A1* | 1/2023 | Ashikawa | H10N 30/1051 |

FOREIGN PATENT DOCUMENTS

| | | | | |
|---|---|---|---|---|
| CN | 202472188 U | 10/2012 | | |
| CN | 103926747 A | 7/2014 | | |
| CN | 104749814 A | 7/2015 | | |
| CN | 105353567 A | 2/2016 | | |
| CN | 106094361 A | 11/2016 | | |
| CN | 107861299 A * | 3/2018 | | G02F 1/133512 |
| CN | 208737160 U | 4/2019 | | |
| CN | 109884826 A | 6/2019 | | |
| CN | 110850655 A | 2/2020 | | |
| CN | 113433746 A | 9/2021 | | |
| KR | 20140141833 A | 12/2014 | | |
| WO | WO-2021200455 A1 * | 10/2021 | | B06B 1/06 |

\* cited by examiner

DISPLAY PANEL AND DISPLAY DEVICE

FIELD OF INVENTION

The present invention relates to the field of display technology, and more particularly to a display panel and a display device.

BACKGROUND OF INVENTION

Color filter on array (COA) technology combines a color filter and an array substrate together, capable of using in a curved display, and also can reduce parasitic capacitance of pixels in a panel, and has been widely used in various applications in the field of display technology.

To separate the color filter and the array substrate from each other, a photo spacer (PS) is arranged therebetween. In a COA panel, the PS is arranged on a color resist layer. When the color filter and the array substrate are laminated to form a box, the color resist layer and the PS are compressed together. Conventional color resist layer has a greater thickness, and would severely influence the calculation of the compression rate of the PS, so that a relatively large deviation for the height of the PS would be incurred, thereby affecting introduction of liquid crystal.

SUMMARY OF INVENTION

The purpose of the present invention is to provide a display panel and a display device, which help increase the accuracy of arrangement of a height of a photo spacer.

Embodiments of the present invention provide a display panel, which comprises:
 a first substrate, comprising:
 a TFT layer; and
 a color resist layer disposed on the TFT layer, wherein the color resist layer is provided with an opening that at least partly penetrates the color resist layer;
 a second substrate disposed above the first substrate; and
 a photo spacer disposed between the first substrate and the second substrate, wherein an end of the photo spacer away from the second substrate is located in the opening.

In an embodiment, the opening completely penetrates through the color resist layer.

In an embodiment, the opening comprises a top surface and a bottom surface, the top surface having an area that is greater than an area of the bottom surface, wherein the top surface is a surface of the opening that is adjacent to the second substrate, and the bottom surface is a surface of the opening that is away from the second substrate; and
 the photo spacer comprises a bottom portion and a top portion, the top portion having a surface area that is less than a surface area of the bottom portion, wherein the top portion is an end portion of the photo spacer that is adjacent to the second substrate, and the bottom portion is an end portion of the photo spacer that is away from the second substrate.

In an embodiment, the TFT layer comprises:
 a TFT; and
 a first support layer located at one side of the TFT;
 the opening comprises:
 a first opening arranged above the TFT; and
 a second opening arranged above the first support layer;
 the photo spacer comprises:
 a first photo spacer, wherein an end of the first photo spacer away from the second substrate is disposed in the first opening; and
 a second photo spacer, wherein an end of the second photo spacer away from the second substrate is disposed in the second opening.

In an embodiment, an end of the first photo spacer close to the second substrate is in contact with the second substrate, and a space is defined between an end of the second photo spacer close to the second substrate and the second substrate.

In an embodiment, the display panel further comprises:
 a second support layer, wherein the second support layer is arranged between the first photo spacer and the TFT, and the second support layer is arranged between the second photo spacer and the first support layer, wherein Young's modulus of the second support layer is greater than Young's modulus of the color resist layer.

In an embodiment, the display panel further comprises an electrode layer, wherein the electrode layer is arranged on the color resist layer;
 the second support layer comprises:
 a first passivation layer and a second passivation layer, wherein the first passivation layer is arranged on the TFT and the first support layer, the first passivation layer is in direct contact with the second passivation layer in the opening, the TFT and the first support layer, the second passivation layer is arranged on the first passivation layer, and also arranged under the first photo spacer, the second photo spacer, and the electrode layer, the second passivation layer is in direct contact with the first photo spacer and the second photo spacer in the opening, Young's modulus of the first passivation layer and the second passivation layer is greater than Young's modulus of the color resist layer.

In an embodiment, the color resist layer comprises a first color resist block and a second color resist block; the first color resist block covers a side surface and a portion of a top surface of the second color resist block; the first color resist block and the second color resist block are disposed on the first passivation layer and the second passivation layer; the opening is arranged above the first color resist block and the second color resist block, the electrode layer is arranged on the first color resist block and the second color resist block.

In an embodiment, the first support layer comprises a first metal layer and a first insulation layer on the first metal layer; the first metal layer and the gate electrode layer of the TFT are arranged on a same layer; the first insulation layer and the gate insulation layer of the TFT are arranged on a same layer.

In an embodiment, the photo spacer is fixed on the first substrate, or fixed on the second substrate.

Embodiments of the present invention also provide a display device, which comprises a display panel, the display panel comprising:
 a first substrate, comprising:
 a TFT layer; and
 a color resist layer disposed on the TFT layer, wherein the color resist layer is provided with an opening that at least partly penetrates the color resist layer;
 a second substrate disposed above the first substrate; and
 a photo spacer disposed between the first substrate and the second substrate, wherein an end of the photo spacer away from the second substrate is located in the opening.

In an embodiment, the opening completely penetrates through the color resist layer.

In an embodiment, the opening comprises a top surface and a bottom surface, the top surface having an area that is greater than an area of the bottom surface, wherein the top surface is a surface of the opening that is adjacent to the second substrate, and the bottom surface is a surface of the opening that is away from the second substrate; and the photo spacer comprises a bottom portion and a top portion, the top portion having a surface area that is less than a surface area of the bottom portion, wherein the top portion is an end portion of the photo spacer that is adjacent to the second substrate, and the bottom portion is an end portion of the photo spacer that is away from the second substrate.

In an embodiment, the TFT layer comprises:
a TFT; and
a first support layer located at one side of the TFT;
the opening comprises:
a first opening arranged above the TFT; and
a second opening arranged above the first support layer;
the photo spacer comprises:
a first photo spacer, wherein an end of the first photo spacer away from the second substrate is disposed in the first opening; and
a second photo spacer, wherein an end of the second photo spacer away from the second substrate is disposed in the second opening.

In an embodiment, an end of the first photo spacer close to the second substrate is in contact with the second substrate, and a space is defined between an end of the second photo spacer close to the second substrate and the second substrate.

In an embodiment, the first substrate further comprises:
a second support layer, wherein the second support layer is arranged between the first photo spacer and the TFT, and the second support layer is arranged between the second photo spacer and the first support layer, wherein Young's modulus of the second support layer is greater than Young's modulus of the color resist layer.

In an embodiment, the first substrate further comprises an electrode layer, wherein the electrode layer is arranged on the color resist layer;
the second support layer comprises:
a first passivation layer and a second passivation layer, wherein the first passivation layer is arranged on the TFT and the first support layer, the first passivation layer is in direct contact with the second passivation layer in the opening, the TFT and the first support layer, the second passivation layer is arranged on the first passivation layer, and also arranged under the first photo spacer, the second photo spacer, and the electrode layer, the second passivation layer is in direct contact with the first photo spacer and the second photo spacer in the opening, Young's modulus of the first passivation layer and the second passivation layer is greater than Young's modulus of the color resist layer.

In an embodiment, the color resist layer comprises a first color resist block and a second color resist block; the first color resist block covers a side surface and a portion of a top surface of the second color resist block, the first color resist block and the second color resist block are disposed on the first passivation layer and the second passivation layer; the opening is arranged above the first color resist block and the second color resist block, the electrode layer is arranged on the first color resist block and the second color resist block.

In an embodiment, the first support layer comprises a first metal layer and a first insulation layer on the first metal layer; the first metal layer and the gate electrode layer of the TFT are arranged on a same layer, the first insulation layer and the gate insulation layer of the TFT are arranged on a same layer.

In an embodiment, the photo spacer is fixed on the first substrate, or fixed on the second substrate.

The beneficial effect of the present disclosure is that: the display panel and the display device provided in the embodiments of the present invention help improve calculation accuracy of the compression rate of the photo spacer by reducing the thickness of the color resist layer, so as to improve the accuracy of arrangement of the height of the photo spacer.

DESCRIPTION OF DRAWINGS

The technical solution of the disclosure, and beneficial advantages thereof, will become apparent by means of a detailed description of embodiments of the application, with reference to the attached drawings.

DETAILED DESCRIPTION OF PREFERRED EMBODIMENTS

Figure 1:
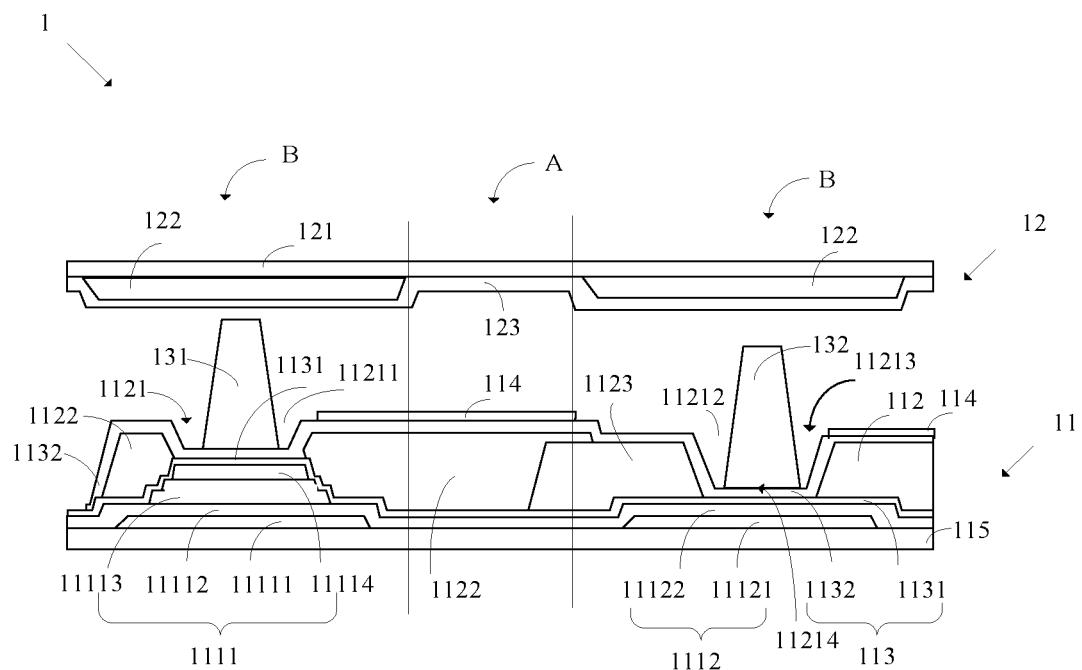
FIG. 1 is a schematic view showing a first structure of a display panel provided in an embodiment of the present invention.

A clear and complete description of a technical solution of an embodiment of the application will be provided below with reference to the drawings of the embodiment of the application. However, the described embodiment covers only some of the embodiments, but not all of the embodiments, of the application. Other embodiments that can be contemplated by skilled artisans of the technical field, without paying creative endeavor, based on the embodiments of the present invention are considered belonging to the scope of protection that the application is pursuing.

In the description of the application, it is appreciated that terms that are used to indicate directional or positional relationships, such as "thickness", "up", "down", "front", "rear", "left", and "right", are based on the directional or positional relationships exhibited in the attached drawings and are used for easing the description of the application and for simplifying the description, and are not intended to suggest or imply that an indicated device or component must exhibit a specific orientation or must be structured or operated in a specific orientation, and should thus be construed as being limitative to the application. Further, terms, such as "first" and "second", are used for the purpose of illustration only, and should not be construed as suggesting or implying any relative level of importance or for implicitly or explicitly indicate the number for any indicated technical features. Thus, features that are attributed by means of "first" and "second" may implicitly or explicitly include one or more of such features. In the description of the application, "multiple" means two or more than two, unless specific constrain is explicitly adopted otherwise.

In the application, unless being otherwise explicitly defined and limited, a first feature being "on" or "below" a second feature includes the first feature and the second feature being in direct contact with each other, and may also include the first feature and the second feature being not in direct contact and being set in contact with another feature between them. Further, a first feature being "on", "upward of", and "above" a second feature includes the first feature being located directly above or obliquely above the second feature, or may just suggest the first feature being at a horizontal height greater than the second feature. A first feature being "below", "downward of", and "under" a second feature includes the first feature being located directly below or obliquely below the second feature, or may just suggest the first feature being at a horizontal height less than the second feature.

The disclosure below provides various embodiments or example for realizing various structure of the application. To simplify the disclosure of the application, the following provides a description to the components and arrangements of specific examples. Of course, they are provided only for illustration and the purpose is not to limit the application. Further, the application uses repeated reference numerals and/or reference characters among different examples, and such repeating is only for the purpose of simplification and clearness and does not, by itself, suggest any relationship among the embodiments and/or arrangements in discussion. Further, the application provides various specific examples for operation and material, and those having ordinary skill in the field would realize application of other arts and/or uses of other materials.

Figure 2:
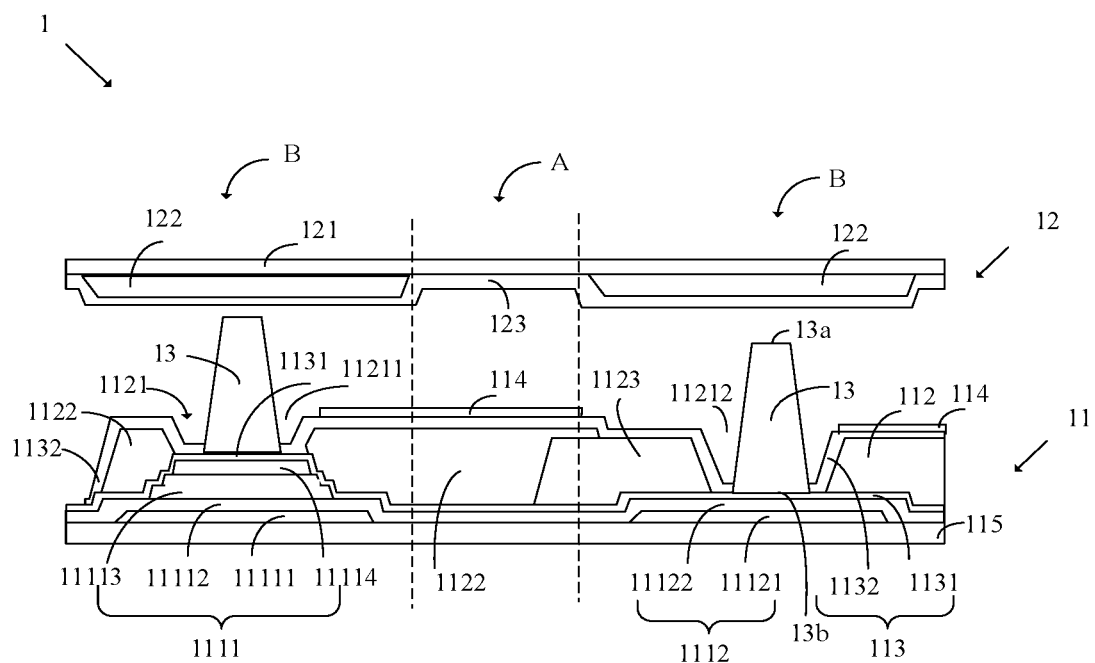
FIG. 2 a schematic view showing a second structure of a display panel provided in an embodiment of the present invention.
Figure 3:
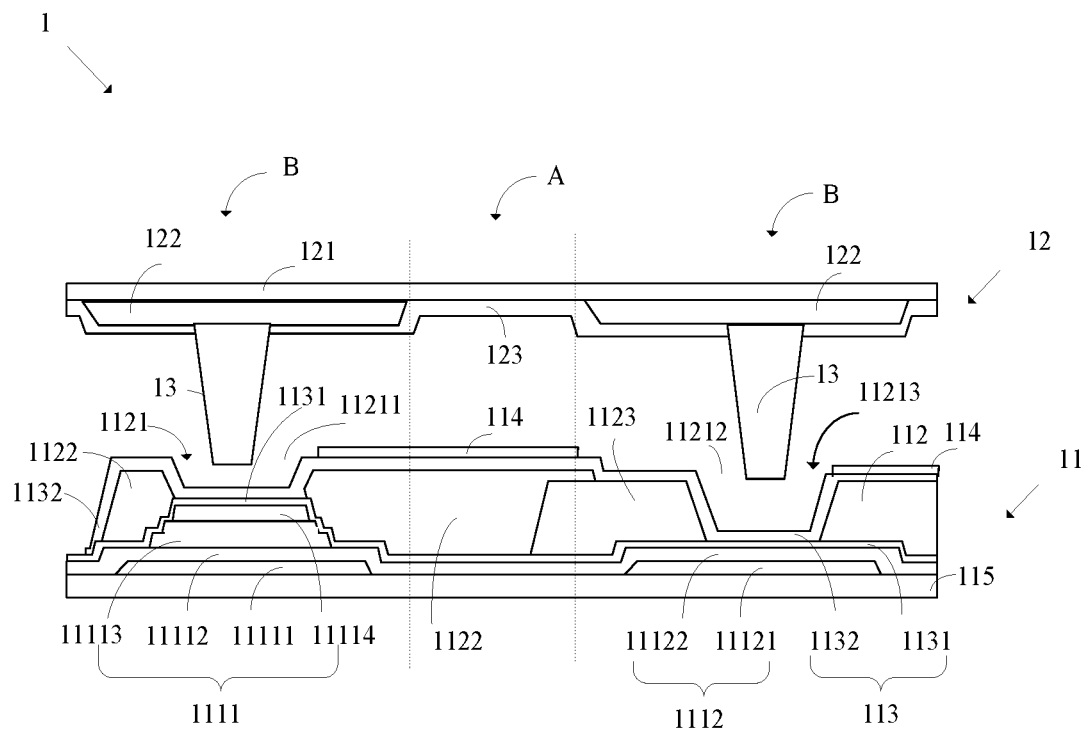
FIG. 3 a schematic view showing a third structure of a display panel provided in an embodiment of the present invention.

Embodiments of the present invention provide a display device. The display device comprises a display panel. Referring to FIGS. 1-3, FIGS. 1-3 are schematic views showing structures of the display panel provided in the embodiments of the present invention. The display panel 1 comprises an opening area A and a non-opening area B. Moreover, the display panel 1 further comprises: a first substrate 11, a second substrate 12, and a photo spacer 13.

The first substrate 11 comprises: a base plate 115, a TFT layer, and a color resist layer 112. The following provides a detailed description to the TFT layer and the color resist layer 112.

The TFT layer comprises: a TFT 1111 and a first support layer 1112. The first support layer 1112 is located at one side of the TFT 1111.

The TFT 1111 comprises a gate electrode layer 11111, a gate insulation layer 11112, a semiconductor layer 11113, and a source-drain electrode layer 11114. The gate electrode layer 11111 and the source-drain electrode layer 11114 are made of metallic materials. The gate insulation layer 11112 is made of an insulative material for electrically isolating the gate electrode layer 11111 and the semiconductor layer 11113.

The first support layer 1112 comprises a first metal layer 11121 and a first insulation layer 11122 on the first metal layer 11121, wherein the first metal layer 11121 and the gate electrode layer 11111 of the TFT 1111 and the first insulation layer 11122, and the gate insulation layer 11112 of the TFT 1111 are respectively arranged on the same layers.

The color resist layer 112 is made of a flexible polymeric material. The color resist layer 112 is located on the TFT layer. When a boxing operation is carried out on the first substrate 11 and the second substrate 12, if there is a color resist material located under the photo spacer 13, the color resist material would be compressed due to a squeezing effect of the photo spacer 13. Since the compression rate of the color resist material is not known, subsequent calculation of a height of the photo spacer 13 would be influenced.

Figure 4:
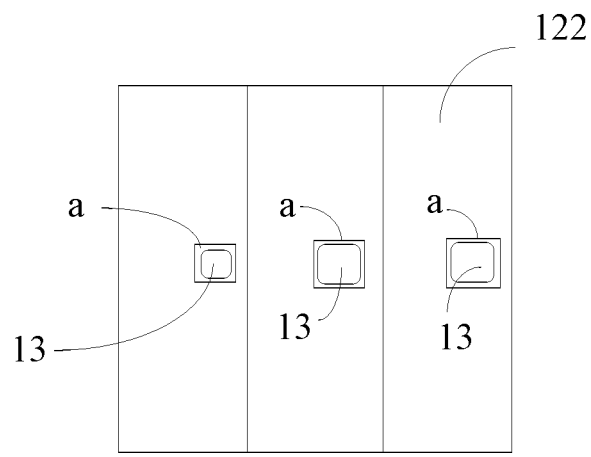
FIG. 4 is a schematic view showing a structure of a photo spacer and a color resist layer of a display panel provided in an embodiment of the present invention.

To above such influence, in the process of forming the color resist layer 112 with a flexible polymeric material, an opening 1121 that penetrates, at least partly, the color resist layer 112 is formed in the color resist layer 112. By reducing the thickness of the color resist layer 112, the influence on the height of the photo spacer 13 is reduced. Specifically, etching may be applied to remove a portion of the flexible polymeric material located under the photo spacer 13 to form the opening 1121. In an embodiment, it is also possible to completely remove the entirety of the flexible polymeric material that is located under the photo spacer 13, as shown in FIG. 1, to have the opening 1121 completely penetrate through the color resist layer 112. As shown in FIG. 4, in viewing the display panel 1 from a top side, there is a gap "a" defined between the photo spacer 13 and the color resist layer 112.

In an embodiment, the opening 1121 comprises: a first opening 11211 and a second opening 11212. The first opening 11211 is arranged above the TFT 1111. The second opening 11212 is arranged above the first support layer 1112.

In an embodiment, the opening 1121 comprises a top surface 11213 and a bottom surface 11214. The top surface 11213 has an area that is greater than an area of the bottom surface 11214, wherein the top surface 11213 is a surface of the opening 1121 that is adjacent to the second substrate 12, and the bottom surface 11214 is a surface of the opening 1121 that is away from the second substrate 12.

The color resist layer 112 comprises a first color resist block 1122 and a second color resist block 1123. The first color resist block 1122 covers a side surface and a portion of a top surface of the second color resist block 1123, and the opening 1121 is arranged above the first color resist block 1122 and the second color resist block 1123.

In an embodiment, the first substrate 11 further comprises: a second support layer 113. The second support layer 113 is arranged between the photo spacer 13 and the TFT 1111 and is arranged between the photo spacer 13 and the first support layer 1112. The second support layer 113 has a Young's modulus that is greater than a Young's modulus of the color resist layer 112.

In an embodiment, the second support layer 113 comprises: a first passivation layer 1131 and a second passivation layer 1132. The first passivation layer 1131 is arranged on the TFT 1111 and the first support layer 1112. The first passivation layer 1131 is in direct contact with the second passivation layer 1132 in the opening 1121, the TFT 1111, and the first support layer 1112. The second passivation layer 1132 is arranged above the first passivation layer 1131 and is arranged under the photo spacer 13. The second passivation layer 1132 is in direct contact with the photo spacer 13 in the opening 1121. The first passivation layer 1131 and the second passivation layer 1132 both have Young's modulus that is greater than the Young's modulus of the color resist layer 112. Further, the first color resist block 1122 and the second color resist block 1123 are disposed on the first passivation layer 1131 and the second passivation layer 1132.

In an embodiment, as shown in FIG. 2, the second support layer 113 comprises: a first passivation layer 1131 and a planarization layer 1135 arranged on the first passivation layer 1131. The planarization layer 1135 is made of a flowable organic material. Similar to the color resist layer 112, when a boxing operation is carried out on the first substrate 11 and the second substrate 12, if there is an organic material located under the photo spacer 13, the organic material would also be compressed due to a squeezing effect of the photo spacer 13. Similarly, since the compression rate of the organic material is not known, subsequent calculation of a height of the photo spacer 13 would be influenced. To above such influence, an opening is formed in the planarization layer 1135, and the opening of the planarization layer 1135 is connected to the opening of the color resist layer 112.

In an embodiment, the first substrate 11 further comprises an electrode layer 114. The electrode layer 114 is arranged on the color resist layer 112. Specifically, the electrode layer 114 is arranged on the first color resist block 1122 and the second color resist block 1123. Further, the second passivation layer 1132 is arranged on the first passivation layer 1131 and is arranged under the photo spacer 13 and the electrode layer 114. The planarization layer 1135 is arranged on the first passivation layer 1131 and under the electrode layer 114.

The second substrate 12 is located above the first substrate 11. The second substrate 12 comprises a backing 121 and a black matrix 122. The black matrix 122 is arranged on the backing 121.

The black matrix 122 is made of a black resinous material or a black metallic material. The black matrix 122 is arranged in the non-opening area B for shielding light.

In an embodiment, the second substrate 12 further comprises: a transparent electrode layer 123, which can be made of indium tin oxide (ITO). The transparent electrode layer 123 is arranged on the black matrix 122 and is arranged on the second substrate 12 that is located in the opening area A.

The photo spacer 13 is located between the first substrate 11 and the second substrate 12. An end of the photo spacer 13 away from the second substrate 12 is located in the opening 1121. The photo spacer 13 comprises a bottom portion 13b and a top portion 13a. The top portion 13a has a surface area that is less than a surface area of the bottom portion 13b, wherein the top portion 13a is an end portion of the photo spacer 13 close to the second substrate 12, and the bottom portion 13b is an end portion of the photo spacer 13 away from the second substrate 12.

The photo spacer 13 can be fixed on the first substrate 11, or can alternatively fixed on the second substrate 12.

When the photo spacer 13 is fixed on the first substrate 11, in an embodiment where the first substrate 11 comprises the planarization layer 1135, the photo spacer 13 is directly arranged on the TFT layer. Further, as shown in FIG. 2, when the first substrate 11 comprises the second passivation layer 1132, the photo spacer 13 is arranged on the second passivation layer 1132.

When the photo spacer 13 is fixed on the second substrate 12, the photo spacer 13 is arranged on the black matrix 122. It is noted that there is no transparent electrode layer 123 arranged between the photo spacer 13 and the black matrix 122. And, the surface area of the top portion 13a of the photo spacer 13 is greater than the surface area of the bottom portion 13b.

As shown in FIG. 1, the photo spacer 13 comprises: a first photo spacer 131 and a second photo spacer 132. An end of the first photo spacer 131 away from the second substrate 12 is disposed in the first opening 11211; an end of the first photo spacer 131 close to the second substrate 12 is in contact with the second substrate 12. An end of the second photo spacer 132 away from the second substrate 12 is disposed in the second opening 11212. A space is defined between and end of the second photo spacer 132 close to the second substrate 12 and the second substrate 12.

Further, when the photo spacer 13 is arranged on the first substrate 11, as shown in FIG. 1, the second support layer 113 is arranged between the first photo spacer 131 and the TFT 1111, and the second support layer 113 is arranged between the second photo spacer 132 and the first support layer 1112. The second passivation layer 1132 is arranged on the first passivation layer 1131 and is arranged under the first photo spacer 131 and the second photo spacer 132. The second passivation layer 1132 is in direct contact with the first photo spacer 131 and the second photo spacer 132 in the opening 1121.

In the following a detailed description will be provided for a method that is used to calculate the height of the photo spacer in a display panel that has a structure as described above. Calculation is first made for a compression rate of the photo spacer during a boxing operation of the display panel. Specifically, the calculation is made based on that the thickness of each film layer of the display panel in the opening area is equal to the thickness of each film layer in the non-opening area.

In the display panel 1 shown in FIG. 1, the height of the photo spacer 13*the compression rate+a height of the black matrix 122 in the non-opening area B+a height of the transparent electrode layer 123 in the non-opening area B+a height of the TFT 1111+a height of the first passivation layer 1131 in the non-opening area B+a height of the second passivation layer 1132 in the non-opening area B=a liquid crystal layer gap+a height of the transparent electrode layer 123 in the opening area A+a height of the electrode layer 114 in the opening area A+a height of the color resist layer 112 in the opening area A+a height of the first passivation layer 1131 in the opening area A+a height of the second passivation layer 1132 in the opening area A. In the above equation, the height of the photo spacer 13 can be acquired in advance, and the height of each film layer of the first substrate 11 and the second substrate 12 can be obtained through measurement, and thus, the compression rate of the photo spacer 13 can be calculated.

During mass production of the display panel, based on the above equation, the heights of the film layers of the first substrate 11 and the second substrate 12 and calculation, the compression rate of the photo spacer 13 is determined and the height of the photo spacer 13 can be determined.

It is noted that the height of the photo spacer of a display panel having a structure of FIG. 2 or 3 can be determined in a similar way, and repeated description will be omitted herein.

The display panel and the display device provided in the embodiments of the present invention help improve calculation accuracy of the compression rate of the photo spacer by reducing the thickness of the color resist layer, so as to improve the accuracy of arrangement of the height of the photo spacer.

In the above embodiments, although focuses are placed on different parts of each embodiment, any part of one embodiment that has not been described in detail could refer to a related description of other embodiments.

A detailed description has been provided above for a display panel and a display device according to embodiments of the application. Specific examples are involved in the disclosure for expounding the principle of and the ways of embodying the application. The description of the embodiments provided above is only for helping understand the technical solution and the core idea of the application. Those having ordinary skill in the field may appreciate that it is still possible to make modification on the technical solution provided for the embodiments, or some of the technical features may be substituted in an equivalent way. Such modification and substitution do not make related technical solutions departing from the scope of the technical solution provided in each embodiment of the application.

What is claimed is:

1. A display panel, comprising:
a first substrate, comprising:
a thin film transistor (TFT) layer; and
a color resist layer disposed on the TFT layer, wherein the color resist layer is provided with an opening that at least partly penetrates the color resist layer;
a second substrate disposed above the first substrate; and
a photo spacer disposed between the first substrate and the second substrate, wherein an end of the photo spacer away from the second substrate is located in the opening,
wherein the TFT layer comprises:
a TFT; and
a first support layer located at one side of the TFT;
the opening comprises:
a first opening arranged above the TFT; and
a second opening arranged above the first support layer;
the photo spacer comprises:
a first photo spacer, wherein an end of the first photo spacer away from the second substrate is disposed in the first opening; and
a second photo spacer, wherein an end of the second photo spacer away from the second substrate is disposed in the second opening,
wherein the first substrate further comprises:
a second support layer, wherein the second support layer is arranged between the first photo spacer and the TFT, and the second support layer is arranged between the second photo spacer and the first support layer,
wherein the first substrate further comprises an electrode layer, wherein the electrode layer is arranged on the color resist layer; the second support layer comprises:
a first passivation layer and a second passivation layer, wherein the first passivation layer is arranged on the TFT and the first support layer, the first passivation layer is in direct contact with the second passivation layer in the opening, the TFT and the first support layer, the second passivative layer is arranged on the first passivation layer, and also arranged under the first photo spacer, the second photo spacer, and the electrode layer, the second passivation layer is in direct contact with the first photo spacer and the second photo spacer in the opening, Young's modulus of the first passivation layer and the second passivation layer is greater than Young's modulus of the color resist layer.

2. The display panel according to claim 1, wherein the opening completely penetrates through the color resist layer.

3. The display panel according to claim 1, wherein the opening comprises a top surface and a bottom surface, the top surface having an area that is greater than an area of the bottom surface, wherein the top surface is a surface of the opening that is adjacent to the second substrate, and the bottom surface is a surface of the opening that is away from the second substrate; and
the photo spacer comprises a bottom portion and a top portion, the top portion having a surface area that is less than a surface area of the bottom portion, wherein the top portion is an end portion of the photo spacer that is adjacent to the second substrate, and the bottom portion is an end portion of the photo spacer that is away from the second substrate.

4. The display panel according to claim 1, wherein an end of the first photo spacer close to the second substrate is in contact with the second substrate, and a space is defined between an end of the second photo spacer closed to the second substrate and the second substrate.

5. The display panel according to claim 1, wherein the color resist layer commises a first color resist block and a second color resist block; the first color resist block covers a side surface and a portion of a top surface of the second color resist block, the first color resist block and the second color resist block are disposed on the first passivation layer and the second passivation layer; the opening is arranged above the first color resist block and the second color resist block, the electrode layer i s arranged on the first color resist block and the second color resist block.

6. The display panel according to claim 1, wherein the first support layer comprises a first metal layer and a first insulation layer on the first metal layer; the first metal layer and a gate electrode layer of the TFT are arranged on a same layer; the first insulation layer and a gate insulation layer of the TFT are arranged on a same layer.

7. The display panel according to claim 1, wherein the photo spacer is fixed on the first substrate, or fixed on the second substrate.

8. A display device, comprising a display panel, the display panel comprising:
a first substrate, comprising:
a thin film transistor (TFT) laver; and
a color resist layer, disposed on the TFT layer, wherein the color resist layer is provided with an opening that at least partly penetrates the color resist layer;
a second substrate disposed above the first substrate; and
a photo spacer disposed between the first substrate and the second substrate, wherein an end of the photo spacer away from the second substrate is located in the opening, wherein
the TFT layer comprises:
a TFT; and
a first support layer located at one side of the TFT;
the opening comprises:
a first opening arranged above the TFT; and
a second opening arranged above the first support layer;
the photo spacer comprises:
a first photo spacer, wherein an end of the first photo spacer away from the second substrate is disposed in the first opening; and
a second photo spacer, wherein an end of the second photo spacer away from the second substrate is disposed in the second opening,
wherein the first substrate further comprises:
a second support layer, wherein the second support layer is arranged between the first photo spacer and the TFT, and the second support layer is arranged between the second photo spacer and the first support layer,
wherein the first substrate further comprises an electrode layer, wherein the electrode layer is arranged on the color resist layer; wherein the second support layer comprises:
a first passivation layer and a second passivation layer, wherein the first passivation layer is arranged on the TFT and the first support layer, the first passivation layer is in direct contact with the second passivation layer in the opening, the TFT and the first support layer, the second passivation layer is arranged on the first passivation layer, and also arranged under the first photo spacer, the second photo spacer, and the electrode layer, the second passivation layer is in direct contact with the first photo spacer and the second photo spacer in the opening, Young's modulus of the first passivation layer and the second passivation layer is greater than Young's modulus of the color resist layer.

9. The display device according to claim 8, wherein the opening completely penetrates through the color resist layer.

10. The display device according to claim 8, wherein
the opening comprises a top surface and a bottom surface, the top surface having an area that is greater than an area of the bottom surface, wherein the top surface is a surface of the opening that is adjacent to the second substrate, and the bottom surface is a surface of the opening that is away from the second substrate; and
the photo spacer comprises a bottom portion and a top portion, the top portion having a surface area that is less than a surface area of the bottom portion, wherein the top portion is an end portion of the photo spacer that is adjacent to the second substrate, and the bottom portion is an end portion of the photo spacer that is away from the second substrate.

11. The display device according to claim 8, wherein an end of the first photo spacer close to the second substrate is in contact with the second substrate, and a space is defined between an end of the second photo spacer that is close to the second substrate and the second substrate.

12. The display device according to claim 8, wherein the color resist layer comprises a first color resist block and a second color resist block; the first color resist block covers a side surface and a portion of a top surface of the second color resist block; the first color resist block and the second color resist block are disposed on the first passivation layer and the second passivation layer; the opening is arranged above the first color resist block and the second color resist block, the electrode layer is arranged on the first color resist block and the second color resist block.

13. The display device according to claim 8, wherein the first support layer comprises a first metal layer and a first insulation layer on the first metal layer; the first metal layer and a gate electrode layer of the TFT are arranged on a same layer, the first insulation layer and a gate insulation layer of the TFT are arranged on a same layer.

14. The display device according to claim 8, wherein the photo spacer is fixed on the first substrate, or fixed on the second substrate.

* * * * *